United States Patent
Hughes

(10) Patent No.: US 8,424,184 B2
(45) Date of Patent: Apr. 23, 2013

(54) ASSEMBLY OF A SHAFT AND A HOUSING ASSEMBLY

(75) Inventor: Simon Alan Hughes, Bristol (GB)

(73) Assignee: Saint-Gobain Performance Plastics Rencol Limited, Coventry (GB)

( * ) Notice: Subject to any disclaimer, the term of this patent is extended or adjusted under 35 U.S.C. 154(b) by 84 days.

(21) Appl. No.: 13/103,655

(22) Filed: May 9, 2011

(65) Prior Publication Data

US 2011/0271512 A1 Nov. 10, 2011

Related U.S. Application Data

(62) Division of application No. 11/835,333, filed on Aug. 7, 2007, now Pat. No. 7,958,637.

(30) Foreign Application Priority Data

Aug. 7, 2006 (GB) .................................... 0615672.3

(51) Int. Cl.
  *B23P 11/02* (2006.01)
(52) U.S. Cl.
  USPC .......................................................... 29/450
(58) Field of Classification Search ............ 29/450, 29/451, 895, 436, 895.2, 895.21, 895.213, 29/895.22, 895.3; 384/280, 283; 464/30, 464/162, 41, 89; 403/288, 365
  See application file for complete search history.

(56) References Cited

U.S. PATENT DOCUMENTS

| | | |
|---|---|---|
| 3,061,386 A | 10/1962 | Dix et al. |
| 3,633,398 A | 1/1972 | Koch |
| 3,700,271 A | 10/1972 | Blaurock et al. |
| 3,838,928 A | 10/1974 | Blaurock et al. |
| 4,286,894 A | 9/1981 | Rongley |
| 9,828,423 | 5/1989 | Cramer, Jr. et al. |
| 4,981,390 A | 1/1991 | Cramer, Jr. et al. |
| 6,288,878 B1 | 9/2001 | Misso et al. |

(Continued)

FOREIGN PATENT DOCUMENTS

| | | |
|---|---|---|
| DE | 1 872 950 | 5/1963 |
| DE | 32 48 148 | 7/1984 |

(Continued)

OTHER PUBLICATIONS

Office Communication Paper mailed on Feb. 13, 2008 for U.S. Appl. No. 10/552,875, filed on Oct. 13, 2005.

(Continued)

*Primary Examiner* — John C Hong

(74) *Attorney, Agent, or Firm* — Abel Law Group, LLP; Chi S. Kim

(57) ABSTRACT

A shaft is held in place within the bore of a housing by a band of resilient material that is located between the shaft and the housing and has a series of projections extending radically inwards. The shaft surface has a first part that lies closer to the longitudinal axis of the bore than a second part, when the shaft and housing are assembled. The shaft is initially inserted into the resilient band, which is held within the bore, such that the first part of the shaft surface is oriented towards one of the projections of the resilient band. In this orientation of the shaft, the projection is not compressed. By orienting the second part of the shaft surface the projection, the projection is brought under compression and the shaft is held firmly within the bore.

6 Claims, 4 Drawing Sheets

U.S. PATENT DOCUMENTS

| | | |
|---|---|---|
| 6,333,839 B1 | 12/2001 | Misso et al. |
| 6,480,363 B1 | 11/2002 | Prater |
| 6,755,746 B2 | 6/2004 | Barnley et al. |
| 7,580,225 B2 | 8/2009 | Hanrahan et al. |
| 7,658,677 B2 | 2/2010 | Needes et al. |
| 7,958,637 B2 * | 6/2011 | Hughes .......................... 29/895 |
| 8,021,072 B2 * | 9/2011 | Court et al. ................... 403/372 |
| 2002/0024770 A1 | 2/2002 | Hong et al. |

FOREIGN PATENT DOCUMENTS

| | | |
|---|---|---|
| DE | 19915417 A1 | 10/1999 |
| EP | 0 554 144 A1 | 8/1993 |
| EP | 1 302 684 A1 | 4/2003 |
| GB | 195 795 A | 4/1923 |
| GB | 972 589 A | 10/1964 |
| GB | 2382386 | 5/2003 |
| JP | 59-166711 | 9/1984 |
| WO | 03/025907 | 3/2003 |

OTHER PUBLICATIONS

International Search Report for PCT/G82004/001681 mailed on Sep. 13, 2004.

European Search Report for European Application No. 07 25 2993 mailed Dec. 19, 2007 (7 pgs).

* cited by examiner

ASSEMBLY OF A SHAFT AND A HOUSING ASSEMBLY

CROSS-REFERENCE TO RELATED APPLICATION(S)

The present application is a divisional application of U.S. patent application Ser. No. 11/835,333, filed Aug. 7, 2007 entitled "ASSEMBLY OF A SHAFT AND A HOUSING ASSEMBLY," naming inventor Simon Alan Hughes, which application claims priority under 35 U.S.C. §119(a) to United Kingdom Application No. 0615672.3, filed Aug. 7, 2006, of which both applications are incorporated by reference herein in their entirety.

FIELD OF INVENTION

1. Background of the Invention

The present invention relates to a method of assembling an apparatus having a housing with a bore therein and a shaft received in the bore and connected thereto to be held in the bore. It also relates to an apparatus assembled by such a method, and also to a pre-assembly from which such an apparatus is assembled.

2. Description of the Prior Art

It is known to connect together a housing and a shaft received in a bore of the housing by a tolerance ring. The tolerance ring may be used to hold the shaft in place in the bore, or it may act as a force limiter to permit torque to be transmitted between the shaft and the housing. Tolerance rings are used, for example, to transmit torque provided that torque does not exceed some predetermined value. The use of a tolerance ring permits minor variations in the diameter of the shaft and the bore to be accommodated without affecting the housing and shaft interconnection.

A tolerance ring generally comprises a band of resilient material, for example a metal such as spring steel, the ends of which are brought together to form a ring. A strip of projections extend radially outwards from the ring, or radially inwards towards the centre of the ring. Usually, the projections are formations, possibly regular formations, such as corrugations, ridges, waves or fingers.

When the ring is located in the annular space between, for example, a shaft and a bore in a housing in which the shaft is located, the projections are compressed. Each projection acts as a spring and exerts a radial force against the shaft and the surface of the bore, providing an interference fit between the shaft and the housing. Rotation of the housing or the shaft will produce similar rotation in the other of the shaft or the housing, as torque is transmitted by the ring. Likewise, linear movement of the housing or the shaft will produce similar linear movement in the other of the shaft or the housing, as the linear force is transmitted by the ring. If forces (rotational or linear) are applied to one or both of the shaft and the housing, such that the resultant force between the mating components is higher, than a certain threshold value, the shaft or housing will move relative to one another, i.e. they will slip. In this application, this threshold value is referred to as the "slip force" of the shaft, housing and force limiter apparatus.

Although tolerance rings usually comprise a strip of resilient material that is curved to allow the easy formation of a ring by overlapping the ends of the strip, they may also be manufactured as an annular band.

Tolerance rings can thus provide torque transfer or torque limiting functions, provide axial retention or axial sliding force control by providing an interference fit as the projections are compressed between the mating components of the assembly.

Typically, on assembling an apparatus with an interference fit between components, the tolerance ring is held stationary at a point along a first inner or outer component and the second respective mating component is pressed axially into or over the tolerance ring and the first mating component, thus contacting and compressing the projections of the ring during the axial movement and providing the interference fit. The amount of force required to assemble the apparatus depends on the stiffness of the projections and the degree, of compression required, and is typically related to the amount of load transmitted by the tolerance ring in its final position, and hence the amount of retention force provided or torque that can be transmitted, or the rigidity of the final assembly.

In some cases it may be beneficial to reduce or eliminate the axial force required for assembly, whilst still resulting in an assembly with high axial force or torque transmission characteristics, or high radial rigidity. For example, in hard disk drive pivot mounts the normal axial dragging of one component relative to the other mating component and the tolerance ring can give rise to surface damage and particle generation. Also, in delicate bearing assemblies, such axial loading during assembly may damage the bearing.

SUMMARY OF THE INVENTION

At its most general, the present invention proposes a method of assembling an apparatus from a pre-assembly, the pre-assembly comprising a first mating component that has a surface with a varying radius, a second mating component, and a band of resilient material located between the two mating components with an uncompressed projection extending therefrom. An interference fit is created between the components by rotating the first mating component to align the projection of the band of resilient material with a part of the surface of the first mating component which has a radius sufficient to compress the projection. This method of assembly minimises dragging of the first component along the band of resilient material, and subsequent surface damage to the first component.

Thus, according to a first aspect of the present invention, there may be provided a method of assembling an apparatus, the method comprising the steps of:

a) forming a pre-assembly comprising:
a shaft;
a housing having a bore with the shaft therein; and
a band of resilient material located between the shaft and the housing having a series of projections extending radially inwards from a circumferential surface, thereof, a peak radius of the band being the distance between the peak of a projection of the series of projections and the longitudinal axis of the bore of the housing;

the shaft having an outer surface, the distance between that outer surface and said longitudinal axis varying around the shaft, such that the surface has a first part where the distance from said axis to the outer surface is less than or equal to the peak radius, and an adjacent second part where the distance is greater than the peak radius;

wherein said projection of the band is axially and circumferentially aligned with the first part of the outer surface; and then b) rotating the shaft relative to the band such that said projection of the band is axially and circumferentially aligned with the second part of the outer surface, whereby said projection of the band is compressed, thereby to secure together the shaft and the housing.

The "shaft" can be a solid or a hollow component, or the outer component of a complex component formed of several parts, such as a bearing. The "bore" may extend fully through the housing, or only extend partially through or into the housing.

Once the assembly is complete, the apparatus produces resistance to both axial and rotational movement of the shaft relative to the housing.

The securing together of the shaft and the housing is achieved due to the frictional engagement of the shaft with the band and the housing with the band. Such securing should normally be sufficiently strong to prevent relative movement of the shaft and the housing under normal use, but to permit relative movement in extreme circumstances. It is then desirable that the strength of frictional engagement between said projection of the band and the second part of the surface of the shaft is stronger than the frictional engagement between the band and the housing, so that the band will remain secured to the shaft whilst any relative slipping between the shaft and housing occurs at the boundary between the band and the housing.

A first step in forming the pre-assembly is normally to axially locate the band of resilient material at a point along one of the shaft and the housing. If the band is located at a point along the shaft, the shaft and the band are first rotated relative to each other to circumferentially align said projection of the band with the first part of the outer surface of the shaft, and then the band is moved axially to a point at which the first and second parts of the shaft surface are axially aligned with said projection. Alternatively, if in the first step the band is located at a point along the housing there are, of course, no first and second parts of a surface with, which said projection of the band may be circumferentially aligned, and thus the band can be moved axially along the housing regardless of their relative circumferential orientation.

A subsequent step is to then move the other of the shaft and the housing axially relative to the band. If the other mating component is the shaft, the shaft and the band are rotated relative to each other to circumferentially align said projection of the band with the first part of the outer surface of the shaft, and then the shaft is moved axially to a point at which the first and second parts of the shaft surface are axially aligned with said projection. Alternatively, if the other mating component is the housing, it can be moved axially relative to the band, regardless of their relative circumferential orientation, since the orientation of the housing does not determine whether said projection becomes compressed.

At the end of these steps in the formation of the pre-assembly, the shaft is in a position whereby said projection of the band is axially and circumferentially aligned with the first part of the surface of the shaft, and thus said projection of the band is not compressed.

The first part of the shaft surface has increased radial clearance between the band and the shaft, in comparison to the second part of the shaft surface, and consequently the method of assembly of the present invention avoids axial dragging of the shaft along the band of resilient material. Therefore, minimal effort is required to axially align all of the shaft, the housing and the band. The only significant force applied is a torque to finally align said projection of the band with the second part of the outer surface of the shaft, thereby performing a camming operation to compress said projection of the band.

The distance covered with said projection under compression for the assembly process is significantly reduced compared to conventional assembly methods, and so scraping of the surfaces of the mating components, i.e. the shaft or the housing, is minimised, which in turn minimises particle generation.

Preferably there are a plurality of first and second parts of the outer surface of the shaft. Said first and second parts may be arranged such that they are in diametrically opposing pairs of first parts and diametrically opposing pairs of second parts. Each of the plurality of first parts of the shaft surface may be an equal distance from the longitudinal axis of the bore of the housing, or some or all of the first parts may be a different distance from the longitudinal axis. Similarly, each of the plurality of second parts of the shaft surface may have an equal maximum distance from the longitudinal axis of the bore of the housing, or some or all of the second parts may have a different maximum distance from the longitudinal axis.

Whether there is one second part or a plurality of second parts, it or each of them may extend fully or only partially along the length of the shaft. The profile of the adjacent first and second parts of the outer surface of the shaft may describe a wave, such as a sinusoidal wave or a wave having a series of flat spots joined to one another.

The band, e.g. a tolerance ring, may be an open or closed loop of material, i.e. it may extend entirely or only partly around the perimeter of the shaft. The projections of the band of resilient material may be arranged such that pairs of projections are diametrically opposing. Preferably, there is an equal distance between the longitudinal axis of the bore of the housing and the peak of each of the projections. In this case, the peak radius can be measured from the longitudinal axis to the peak of any one of the projections. However, there may alternatively be a different distance between the longitudinal axis and each peak.

It will be appreciated that the same effect can be achieved with the housing having the surface with first and second parts, instead of the shaft, and the projections of the band extending radially outwards.

Thus, the present invention may also provide a method of assembling an apparatus, the method comprising the steps of:
a) forming a pre-assembly comprising:
a shaft;
a housing having a bore with the shaft therein; and
a band of resilient material located between the shaft and the housing having a series of projections extending radially outwards from a circumferential surface thereof, a peak radius of the band being the distance between the peak of a projection of the series of projections and the longitudinal axis of the shaft;
the bore of the housing having an inner surface, the distance between that inner surface and said longitudinal axis varying around the bore, such that the surface has a first part where the distance from said axis to the inner surface is greater than or equal to the peak radius, and an adjacent second part where the distance is less than the peak radius;
wherein said projection of the band is axially and circumferentially aligned with the first part of the inner surface; and then
b) rotating the housing relative to the band such that said projection of the band is axially and circumferentially aligned with the second part of the inner surface, whereby said projection of the band is compressed, thereby to secure together the shaft and the housing.

The preferred and optional features of the parts of the outer surface of the shaft, discussed above, apply also in this latter case as preferred and optional features of the parts of the inner surface of the bore.

Furthermore, the steps described above to form the pre-assembly are also applicable to this latter case, with terms relating to the shaft and the first and second parts of the shaft surface being substituted for terms relating to the housing and the first and second parts of the bore surface, respectively.

According to a second aspect of the present invention, there may be provided a pre-assembly for an apparatus comprising:

a shaft;

a housing having a bore with the shaft therein; and a band of resilient material located between the shaft and the housing having a series of projections extending radially inwards from a circumferential surface thereof, a peak radius of the band being the distance between the peak of a projection of the series of projections and the longitudinal axis of the bore of the housing;

the shaft having an outer surface, the distance between that outer surface and said longitudinal axis varying around the shaft, such that the surface has a first part where the distance from said axis to the outer surface is less than or equal to the peak radius, and an adjacent second part where the distance is greater than the peak radius;

wherein said projection of the band is axially and circumferentially aligned with the first part of the outer surface of the shaft.

The second aspect of the present invention may also provide a pre-assembly for an apparatus comprising:

a shaft;

a housing having a bore with the shaft therein; and a band of resilient material located between the shaft and the housing having a series of projections extending radially outwards from a circumferential surface thereof, a peak radius of the band being the distance between the peak of a projection of the series of projections and the longitudinal axis of the shaft;

the bore of the housing having an inner surface, the distance between that inner surface and said longitudinal axis varying around the bore, such that the surface has a first part where the distance from said axis to the inner surface is greater than or equal to the peak radius, and an adjacent second part where the distance is less than the peak radius;

wherein said projection of the band is axially and circumferentially aligned with the first part of the inner surface of the bore.

According to a third aspect of the present invention, there may be provided an apparatus comprising:

a shaft;

a housing having a bore with the shaft therein; and a band of resilient material located between the shaft and the housing having a series of projections extending radially inwards from a circumferential surface thereof;

the shaft having an outer surface, the distance between that outer surface and the longitudinal axis of the bore varying around the shaft, such that the surface has a first part where the distance from said axis to the outer surface is less than the distance from said axis to the outer surface at ah adjacent second part;

wherein a projection of said series of projections of the band is axially and circumferentially aligned with the second part of the outer surface of the shaft.

Preferably, the distance between said longitudinal axis and the outer surface of the shaft at the first part of the surface is less than or equal to a peak radius of the band of resilient material, the peak radius being the distance between said longitudinal axis and the peak of a projection of the series of projections, when said projection is uncompressed. The distance between said longitudinal axis and the outer surface of the shaft at the second part of the surface is preferably greater than this peak radius.

The third aspect of the present invention may also provide an apparatus comprising:

a shaft;

a housing having a bore with the shaft therein; and a band of resilient material located between the shaft and the housing having a series of projections extending radially outwards from a circumferential surface thereof;

the bore of the housing having an inner surface, the distance between that inner surface and the longitudinal axis of the shaft varying around the bore, such that the surface has a first part where the distance from said axis to the inner surface is greater than the distance from said axis to the outer surface at an adjacent second part;

wherein a projection of said series of projections of the band is axially and circumferentially aligned with the second part of the inner surface of the bore.

Preferably, the distance between said longitudinal axis and the inner surface of the bore at the first part of the surface is greater than or equal to a peak radius of the band of resilient material, the peak radius being the distance between said longitudinal axis and the peak of a projection of the series of projections, when said projection is uncompressed. The distance between said longitudinal axis and the inner surface of the bore at the second part of the surface is preferably less than this peak radius.

BRIEF DESCRIPTION OF THE DRAWINGS

Embodiments, of the present invention will now be described in detail, by way of example, with reference to the accompanying drawings, in which.

DETAILED DESCRIPTION

Figure 1:
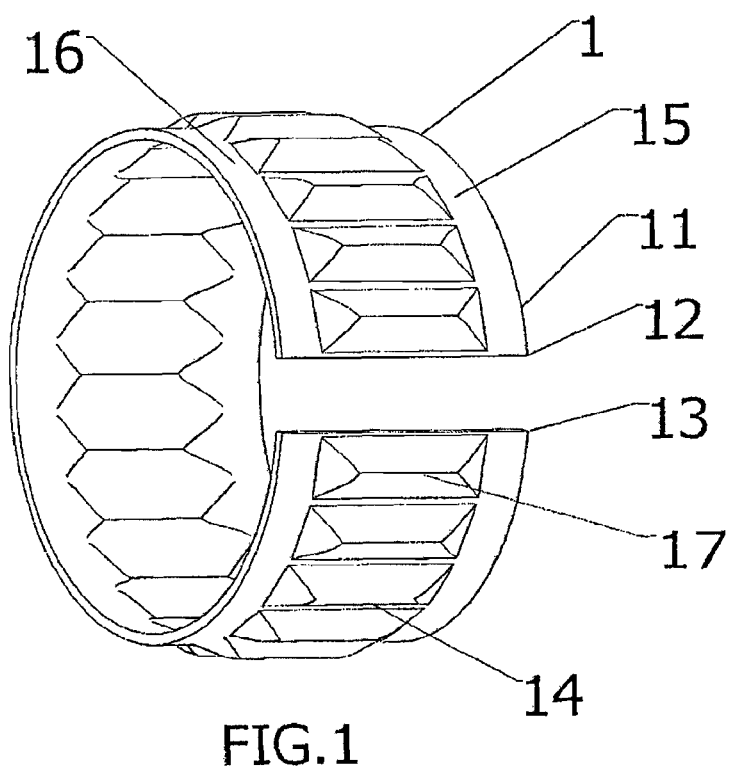
FIG. 1 shows an oblique view of a known tolerance ring.

A known tolerance ring 1 is shown in FIG. 1. The tolerance ring 1 comprises a band of resilient material 11, for example a metal such as spring steel, the ends 12, 13 of which are brought together to form a ring. A strip of projections 14 extend radially outwards from the ring. The projections 14 are regular corrugated formations, and each has a peak 17. The strip of projections 14 is axially flanked by annular regions 15, 16 of the band of resilient material 11 that have no formations.

Figure 2:
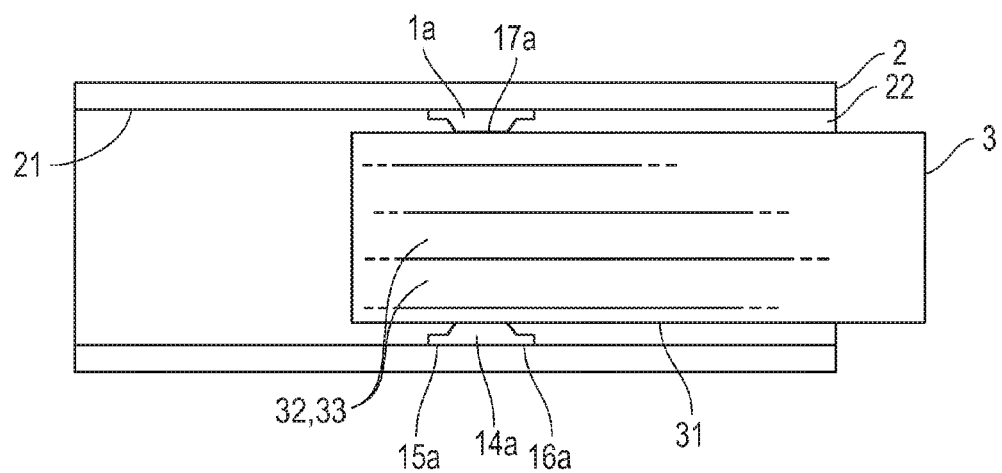
FIG. 2 shows components of an embodiment of the present invention in an assembled state.

FIG. 2 shows a first embodiment of an apparatus according to the present invention. The apparatus includes two mating components 2, 3, which are components of a length-adjustable steering wheel column assembly. The first of the mating components is an inner tube (shaft) 3 of the steering column assembly. The second of the mating components is an outer jacket of the assembly, which essentially comprises a housing 2 having a bore 22 therein.

A tolerance ring 1a is located between the shaft 3 and the housing 2 and provides an interference fit between them. The tolerance ring 1a extends entirely around the circumference of the shaft 3. In contrast to the tolerance ring 1 shown in FIG. 1, the tolerance ring 1a in FIG. 2 has a strip of projections 14a extending radially inwards towards the centre of the ring 1a and thus towards the shaft 3. Each projection 14a has a peak 17a, and each of the peaks 17a are in contact with the outer surface 31 of the shaft 3. As the apparatus in FIG. 2 is fully assembled, each of the projections 14a is compressed by the shaft 3. Annular regions of the ring 1a that have no formations are indicated by reference numerals 15a and 16a. The radially outer surface of the tolerance ring 1a is located at a point along the surface 21 in the bore 22 of the housing 2.

The ring 1a has a "peak radius", which is the distance between the longitudinal axis of the bore 22 through the housing 2, and the peak 17a of a projection of the series of projections 14a, when the projections 14a are not compressed. In this embodiment, each of the peaks 17a is the same distance from the longitudinal axis, and so the peak radius may be measured from the longitudinal axis to the peak 17a of any one of the projections 14a.

The outer surface 31 of shaft 3 of the assembly has first parts 33 and second parts 32. The distance between the longitudinal axis of the bore 22 through the housing 2 and the outer surface 31 of the shaft 3 at each of the first parts 33 is the same as the peak radius, whereas the distance between that longitudinal axis and the outer surface 31 of the shaft 3 at each of the second parts 32 is greater than the peak radius. Moreover, in this embodiment the maximum distances between the longitudinal axis and the outer surface 31 of the shaft 3 at each of the second parts 32 are equal. This, however, need not be the case in other embodiments.

Although FIG. 2 shows the parts 32, 33 of the surface 31 extending axially along only part of the length of the shaft 3, they do in fact extend along the full length of the shaft 3 in this embodiment. However, it will be appreciated that one or all of the second parts 32 may indeed optionally extend only partly along the length of the shaft 3.

As the apparatus in FIG. 2 is in a fully assembled state, with the second parts 32 of the shaft surface 31 contacting and compressing the projections 14a on the tolerance ring 1a, any slipping that occurs between the shaft 3 and the housing 2 occurs at the boundary of the ring 1a and surface 21 of the housing 2.

The process of fully assembling an apparatus according to the invention will now be described briefly, and then in more detail, with reference to FIGS. 2 to 4.

The first step is to locate the tolerance ring 1a at a point along the surface 21 of the bore 22 of the housing 2.

Next, the shaft 3, with first and second parts 33, 32 of its outer surface 31, has its axis aligned with, the longitudinal axis of the bore 22, is then rotated to align the first parts 33 with the projections 14a on the ring 1a, and is then moved axially through the ring 1a and the housing 2 to a position at which the first parts 33 of the surface 31 are axially aligned with the projections 14a. At this position the second parts 32 of the surface 31 of the shaft 3 are axially aligned and circumferentially unaligned with the projections 14a, and the pre-assembly is complete.

The final step of assembly of the apparatus is to rotate the shaft 3 relative to the band 1a and the housing 2 to a position at which each of said second parts 32 of the shaft 3 is axially and circumferentially aligned with a projection 14a of the band 1a, such that the surface 31 of the shaft 3 contacts and compresses projections 14a of the band 1a. At this position, the surface 31 of the shaft 3 contacts the projections 14a at the parts of the second parts 32 where the distance between the longitudinal axis and the surface 31 is a maximum.

As mentioned above, there is a greater distance between the abovementioned longitudinal axis and the surface 31 of the shaft 3 at each of said second parts 32 than at each of said first parts 33. Moreover, the distance between the longitudinal axis and the surface 31 of the shaft 3 at each of the first parts 33 is the same as the radius between the longitudinal axis and peaks, 17a of the projections 14a. Thus, when the shaft 3 is inserted into the passage of the ring 1a, as explained above, the surface 31 of the shaft 3 contacts the projections 14a of the ring 1a in such a way as not to deform them or create an interference fit between the components. This arrangement can be seen in FIG. 3. Of course, the distance between the longitudinal axis and the surface 31 at each of said first parts 33 may be smaller than the radius between the longitudinal axis and peaks 17a of the projections 14a, in which case the surface 31 of the shaft 3 would not contact the projections 14a at all as the shaft 3 is inserted.

Figure 3:
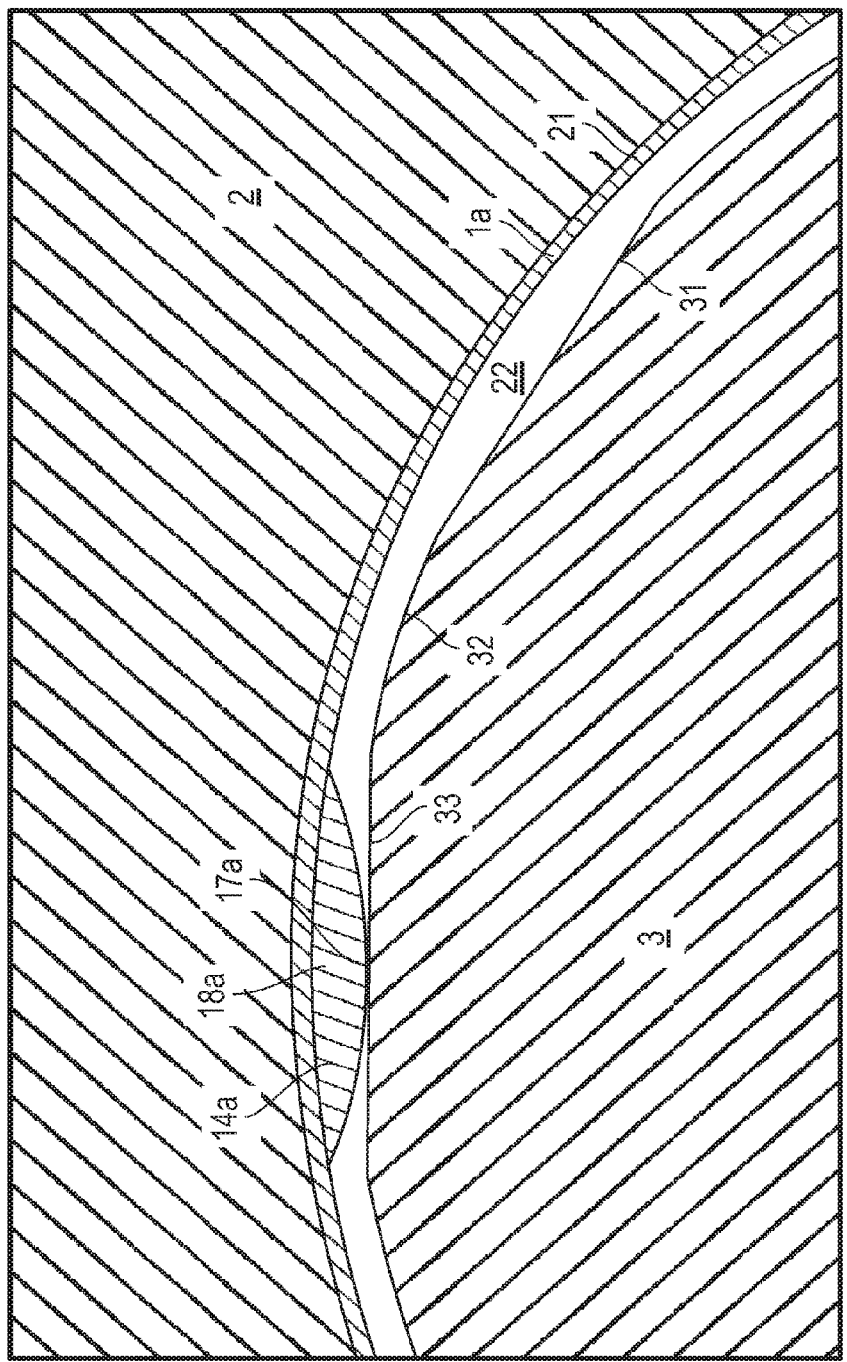
FIG. 3 shows a cross section through the components of that embodiment of the present invention in a pre-assembled state.

FIG. 3 is, a cross section through the components shown in FIG. 2 in an pre-assembled state, i.e. the pre-assembly. The drawing illustrates the first 33 and second 32 parts of the shaft surface 31. In particular, the drawing shows a projection 14a of the ring 1a aligned circumferentially with one of the first parts 33 of the surface 31 such that the surface 31 of the shaft 3 is in contact with the peak 17a of the projection 14a without the projection 14a being deformed.

Alternatively, the dimensions of the shaft 3 and ring 1a may be such that, when the shaft 3 is inserted, into the passage through the ring 1a with the first parts 33 aligned with the projections 14a, as described above, the surface 31 of the shaft 3 does not contact the projections 14a at all. In either case, the insertion of the shaft 3 through the passage of the tolerance ring 1a requires very little effort and leads to minimal or no damage to the surface of the shaft 3, or even the projections 14a.

The projection 14a shown is also labeled as element 18a, indicating that this is the projection 14a at which the peak radius of the ring 1a is measured. However, as mentioned above, all of the peaks 17a of projections 14a of the ring 1a in this embodiment are the same distance from the longitudinal axis of the bore 22, and thus the peak radius may in fact be measured with respect to any of the projections 14a of the ring 1a. In other embodiments of the invention, however, the peaks 17a of the projections 14a may be different distances from the longitudinal axis, and thus one of the projections 14a must be nominated as the projection 18a at which the peak radius is measured.

Subsequent to the position shown in FIG. 3, the final step of the process of assembling the force limiting apparatus is to rotate the shaft 3 relative to the ring 1a to a position at which the first parts 33 of the surface 31 are unaligned with the projections 14a of the ring, and instead the second parts 32 of the surface 31 are aligned with the projections 14a. As the distance between the longitudinal axis and the surface 31 of the shaft 3 at each of the second parts 32 is greater than the distance between the longitudinal axis and each of the peaks 17a of the projections 14a, in this final position the projections 14a are compressed by the shaft surface 31 contacting the projections 14a and applying a force thereto. This position is shown in FIG. 4, which is a cross section through the components of FIG. 2 in the assembled state. In this drawing it, is shown, that the ring 1a is pressed against the housing 2 by a second part 32 of the shaft surface 31, thus increasing the frictional force between the ring 1a and the housing 2 at surface 21.

In use, if forces (rotational or linear) are applied to one or both of the shaft 3 and the housing 2, such that the resultant force between them is lower than the slip force value of the apparatus, the shaft 3 and housing 2 will move in concert with one another, because the force will be transmitted between the mating components 2, 3 through the tolerance ring 1a.

If, however, the resultant force exceeds the slip force value, the mating components 2, 3 will move, i.e. slip, with respect to one another. Such slipping in this embodiment occurs at the boundary between the tolerance ring 1a and the surface 21 of the housing 2.

The value of the slip force is dictated by the frictional force between the tolerance ring 1a and the surface 21 of the housing 2. This frictional force, arid thus the slip force, can be adjusted by e.g. varying the dimensions of the tolerance ring 1a, in order to vary the press force it applies against the surface 21 and/or by varying the type of material used for the tolerance ring 1a, in order to change the coefficient of friction of the ring/housing interface. If a lower value of slip force is required, a tolerance ring 1a of a material giving a lower coefficient of friction of the ring/housing interface can be used. Choosing a tolerance ring material giving a lower coefficient of friction of the ring/housing interface allows the slip force to be lowered without the force applied by the ring 1a requiring to be lowered.

Figure 4:
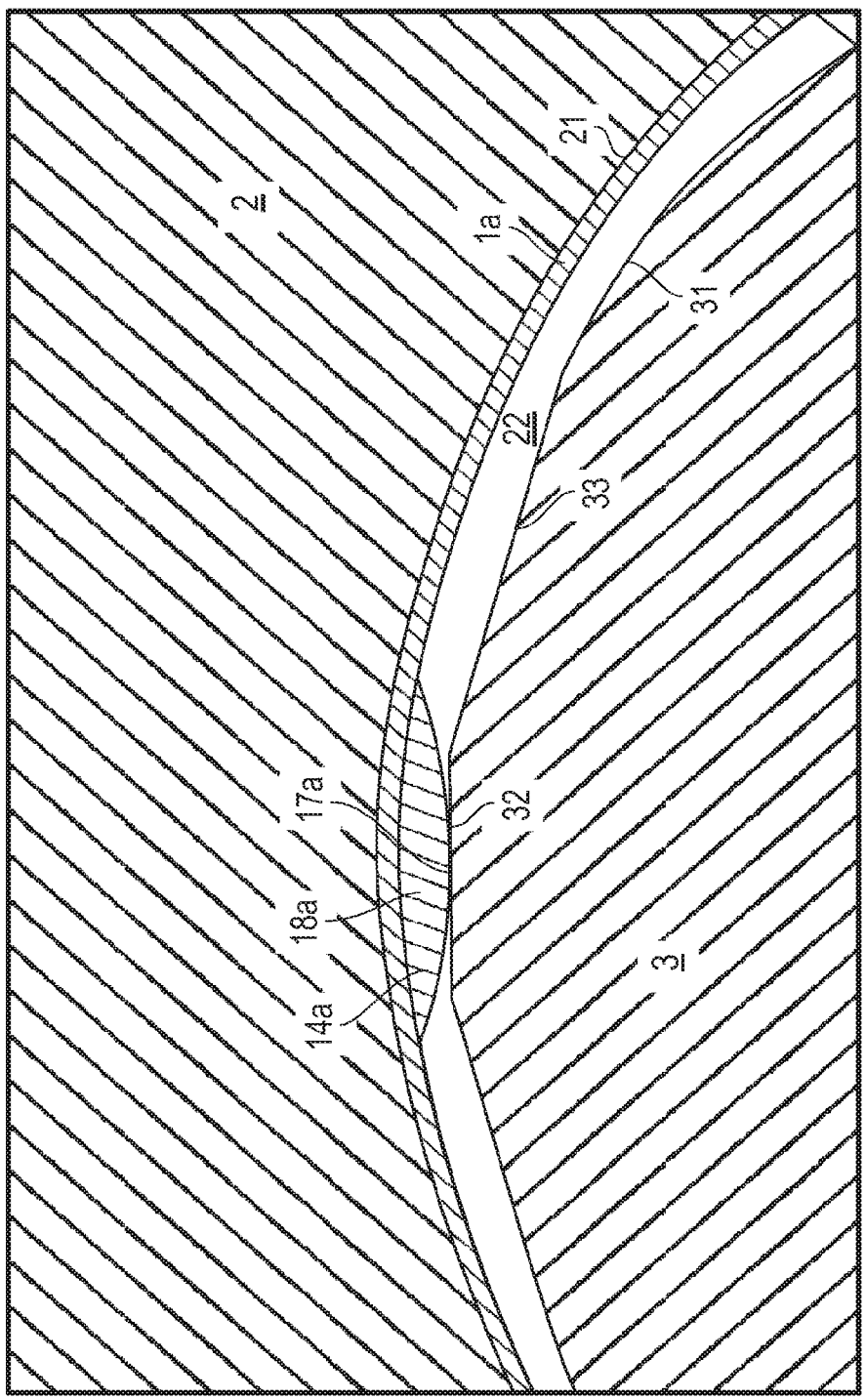
FIG. 4 shows a cross section through the components of FIG. 2 in an assembled state.

Further to the embodiment of FIGS. 2 to 4, it will be appreciated that the same result can be achieved by modifying the components used in the above apparatus and using an alternative arrangement in which the surface 21 of the bore 22 of the housing 2 has first and second parts with varying distances between them and the longitudinal axis of the inserted shaft. There is then a greater distance between the longitudinal axis of the shaft and the surface of the bore at each of said first parts than at each of said second parts.

In this alternative arrangement, the shaft lacks the first and second parts of its surface that Were discussed above, and the projections of the tolerance ring are formed such that they project radially outwards from the ring, indeed as the ring 1 is shown in FIG. 1. The ring again has a "peak radius", which is the distance between the longitudinal axis of the shaft and the peak of a projection of the ring, when the projection is not compressed. In this alternative arrangement, the distances between the peak of each projection and the longitudinal axis are again equal, and thus the peak radius may again be measured with respect to any of the projections.

The distance between the longitudinal axis of the shaft and the surface 21 of the bore 22 at each of said first parts is equal to the peak radius, and thus the surface 21 contacts the projections of the ring at these first parts, but does not compress them. Of course, this distance may be greater than the peak radius of the ring, in which case the surface of the housing would not contact the projections at all. The distance between the longitudinal axis of the shaft 3 and the surface 21 of the bore 22 at each of said second parts is less than the peak radius, and so any projections in contact with the surface at these second parts are compressed. In this embodiment, the minimum distances between the longitudinal axis and the inner surface 21 of the bore 22 at each of the second parts are equal.

In assembling such an alternative apparatus, the tolerance ring can first be located at a point along the shaft or the housing. By way of example, the ring will be located at a point along the bore Of the housing, as was the case in the method described above. When locating the ring at a point along the bore, the projections of the ring are circumferentially aligned with the first parts of the surface 21 of the bore, so as not to be deformed but to just contact the surface 21.

With the projections of the ring still aligned with first parts of the surface of the bore, the shaft is inserted through the ring and the bore of the housing.

The shaft and ring are then rotated relative to the housing such that the projections of the ring are aligned with the second parts of the housing, and are thus compressed. Surface damage to the projections of the tolerance ring and the housing is thus minimised, and any subsequent slipping of the shaft relative to the housing occurs at the interface of the ring and the shaft.

The invention may be used in e.g. steering column sliding mechanisms with the engaging and non-engaging sectors being part of either a steering column tube or its housing, and a tolerance ring located between the two. Despite large radial tolerances between the tube and its housing, a low sliding force may be required. The rotary fixing of the present invention can be used to clamp the tube and housing together through the ring, with the ability to minimise the amount of compression by rotating the mechanism as far as necessary to just grip the assembly.

What is claimed is:

1. A method of assembling an apparatus, said method comprising the steps of:
    a) forming a pre-assembly comprising:
    a shaft;
    a housing having a bore, said bore having a longitudinal axis, said shaft being held in said bore; and
    a band of resilient material located between said shaft and said housing said band having a circumferential surface and a plurality of projections extending radially inwards from said circumferential surface,
    said plurality of projections including a first projection, said first projection having a peak, said peak and said longitudinal axis of said bore having a first distance therebetween, said band having a peak radius equal to said first distance;
    said shaft having an outer surface, said outer surface having a first part and a second part, said outer surface and said longitudinal axis having a second distance therebetween, said shaft having a surface radius equal to said second distance, said surface radius varying around said shaft, such that said surface radius at said first part of said outer surface is less than or equal to said peak radius, and said surface radius at said second part of said outer surface is greater than said peak radius;
    wherein said first projection of said band is axially and circumferentially aligned with said first part of said outer surface; and then
    b) rotating said shaft relative to said band such that said first projection of said band is axially and circumferentially aligned with said second part of said outer surface, whereby said first projection of said band is compressed, thereby to secure together said shaft and said housing.

2. The method of claim 1, wherein said pre-assembly is formed by locating said band on said shaft before said shaft is inserted into said bore of said housing.

3. The method of claim 1, wherein said pre-assembly is formed by locating said band within said bore of said housing before said shaft is inserted into said bore.

4. A method of assembling an apparatus, said method comprising the steps of:
    a) forming a pre-assembly comprising:
    a shaft having a longitudinal axis;
    a housing having a bore, said shaft being held in said bore; and
    a band of resilient material located between said shaft and said housing, said band having a circumferential surface and a plurality of projections extending radially outwards from said circumferential surface, said plurality of projections including a first projection, said first projection having a peak, said peak and said longitudinal axis of said shaft having a first distance therebetween, said band having a peak radius equal to said first distance;

said bore of said housing having an inner surface, said inner surface having a first part and a second part, said inner surface and said longitudinal axis having a second distance therebetween, said bore having a surface radius equal to said second distance, said surface radius varying around said bore, such that said surface radius at said first part of said inner surface is greater than or equal to said peak radius, and said surface radius at said second part of said inner surface is less than said peak radius;

wherein said first projection of said band is axially and circumferentially aligned with said first part of said inner surface; and then b) rotating said housing relative to said band such that said first projection of said band is axially and circumferentially aligned with said second part of said inner surface, whereby said first projection of said band is compressed, thereby to secure together said shaft and said housing.

5. The method of claim 4, wherein said pre-assembly is formed by locating said band on said shaft before said shaft is inserted into said bore of said housing.

6. The method of claim 4, wherein said pre-assembly is formed by locating said band within said bore of said housing before said shaft is inserted into said bore.

* * * * *

UNITED STATES PATENT AND TRADEMARK OFFICE
CERTIFICATE OF CORRECTION

PATENT NO. : 8,424,184 B2  
APPLICATION NO. : 13/103655  
DATED : April 23, 2013  
INVENTOR(S) : Simon Alan Hughes Page 1 of 1

It is certified that error appears in the above-identified patent and that said Letters Patent is hereby corrected as shown below:

Title Page, item (75), delete "Bristol" and insert therefore --Pembrokeshire--.
Title Page, item (56), col. 2, line 3, delete "9,828,423" and insert therefore --4,828,423--.
Title Page, item (57), Abstract, line 11, delete "the projection,".

Signed and Sealed this
Second Day of July, 2013

Teresa Stanek Rea
*Acting Director of the United States Patent and Trademark Office*